(12) United States Patent
Piekny

(10) Patent No.: US 9,340,138 B2
(45) Date of Patent: May 17, 2016

(54) TOWABLE TRAILER HAVING AN ELEVATING AND TILTING PLATFORM

(71) Applicant: Piotr Piekny, Mississauga (CA)

(72) Inventor: Piotr Piekny, Mississauga (CA)

(*) Notice: Subject to any disclaimer, the term of this patent is extended or adjusted under 35 U.S.C. 154(b) by 0 days.

(21) Appl. No.: 14/012,020

(22) Filed: Aug. 28, 2013

(65) Prior Publication Data

US 2014/0064894 A1    Mar. 6, 2014

Related U.S. Application Data

(60) Provisional application No. 61/694,739, filed on Aug. 29, 2012.

(51) Int. Cl.
*B60P 1/34* (2006.01)

(52) U.S. Cl.
CPC ........................................ *B60P 1/34* (2013.01)

(58) Field of Classification Search
CPC .............. B60P 1/34; B60P 1/483; B66F 7/22; B66F 7/0683; B62D 53/062
USPC ............. 414/471, 482, 495; 298/11; 187/211, 187/218, 219, 240, 243
See application file for complete search history.

(56) References Cited

U.S. PATENT DOCUMENTS

| 1,031,818 | A |   | 7/1912  | Putman   |         |
|-----------|---|---|---------|----------|---------|
| 2,449,863 | A |   | 9/1948  | Ross     |         |
| 3,036,865 | A | * | 5/1962  | Stone    | 298/11  |
| 3,240,506 | A |   | 3/1966  | McMullen |         |
| 3,362,552 | A |   | 1/1968  | Thiele   |         |
| 3,429,585 | A |   | 2/1969  | Ross     |         |
| 3,619,007 | A | * | 11/1971 | Phillips | 414/471 |
| 3,642,324 | A | * | 2/1972  | Conner   | 298/11  |
| 3,664,459 | A |   | 5/1972  | Stephens |         |
| 3,685,674 | A |   | 8/1972  | Bruer    |         |
| 3,756,442 | A | * | 9/1973  | Wagenblast et al. | 414/421 |
| 3,902,616 | A | * | 9/1975  | Santic et al. | 414/420 |
| 4,015,879 | A |   | 4/1977  | Shonkwiler |       |
| 4,060,145 | A |   | 11/1977 | Kingman et al. |   |
| 4,344,731 | A | * | 8/1982  | Visa et al. | 414/471 |
| 4,348,054 | A |   | 9/1982  | Shonkwiler |       |
| 4,372,572 | A |   | 2/1983  | Verschage |        |
| 4,375,248 | A | * | 3/1983  | Kishi    | 187/269 |
| 4,474,359 | A |   | 10/1984 | Weaver   |         |
| 4,673,328 | A |   | 6/1987  | Shiels   |         |
| 5,111,546 | A | * | 5/1992  | Hahn et al. | 14/71.3 |

(Continued)

FOREIGN PATENT DOCUMENTS

GB    949699 A    2/1964
WO    9836936 A1  8/1998

OTHER PUBLICATIONS

Search Report and Written Opinion in PCT/CA/2013/000743, dated Nov. 12, 2013.

*Primary Examiner* — Saul Rodriguez
*Assistant Examiner* — Mark Hageman
(74) *Attorney, Agent, or Firm* — Manelli Selter PLLC; Edward J. Stemberger

(57) ABSTRACT

A towable trailer has a main frame and an inner frame, and a scissors-type lift structure between them so as to elevate the inner frame above the main frame. A first hydraulic cylinder is used to actuate the scissor-type lift in order to raise the inner frame. A second hydraulic cylinder is also preferably provided in order to raise the front end of the inner frame, so as to provide a towable trailer having a tiltable and raisable platform which can be more easily loaded and unloaded.

11 Claims, 15 Drawing Sheets

(56) References Cited

U.S. PATENT DOCUMENTS

| | | |
|---|---|---|
| 5,288,197 A | 2/1994 | Harris |
| 5,297,653 A * | 3/1994 | Wurtz et al. ............ 182/69.5 |
| 5,580,134 A * | 12/1996 | Allwine ............... 298/11 |
| 6,273,435 B1 | 8/2001 | Stringer |
| 6,460,653 B1 * | 10/2002 | Hardy et al. ............ 182/63.1 |
| 6,789,829 B1 | 9/2004 | Kapels |
| 7,396,201 B2 | 7/2008 | Pollnow et al. |
| 8,157,316 B1 * | 4/2012 | Bartel ............... 296/183.2 |
| 2005/0173601 A1 * | 8/2005 | Hestand ............... 248/129 |

\* cited by examiner

TOWABLE TRAILER HAVING AN ELEVATING AND TILTING PLATFORM

FIELD OF THE INVENTION

This invention relates to towable trailers, and particularly to trailers, and preferably tandem axle trailers, which may be used by small businesses such as construction contractors, small equipment haulage contractors, and the like. The towable trailer of the present invention finds particular utility in situations where it may be necessary to raise the cargo platform to the level of a loading or unloading dock; or in the same or other circumstances, wherein it may also be necessary to tilt the trailer so as to permit dumping or runoff of the cargo or other load which is on the platform.

BACKGROUND OF THE INVENTION

The present invention provides towable trailers which provide manoeuvrability and operator safety, and which find particular usefulness in the contracting industries. For example, a construction contractor may be required to move a load of products which are secured on pallets to a jobsite where there is a loading dock onto which the products are to be unloaded. In many such circumstances, the contractor's trailer may not be at the same height as the loading dock, which is typically set at a height suitable for unloading of larger truck trailers. In such situations, it would be necessary to remove the products from trailer using a fork lift on the ground, or the like, and then place the products on the loading dock using the fork lift. In particular, the conventional, prior art, contractor trailer would not be able to be placed at a level where a fork lift could travel directly from the loading dock onto the trailer.

Further, if the products are such that they could be rolled or slid off of the trailer, it would still be necessary to use a fork lift to remove the product from the trailer, and place it on the loading dock.

Moreover, it should be noted that at many locations, access to a fork lift is not always provided, and as a result, it is often necessary to arrange to have a fork lift available for use, in such circumstances. This adds to the cost of delivery of the products.

The present invention, however, provides a towable trailer wherein a platform is provided, with is raisable in a level orientation, so as to be movable into alignment with the loading dock (or other application) level.

Further, many contractor's trailers are provided with ramps at one end, to facilitate the ability of a fork lift to travel onto the trailer, or to roll product off of the trailer onto the ground. However, in many situations, the ramps are commonly angled at a sharp angle so that they will provide the necessary ramp strength. As a result, these ramps commonly have a ramp angle that is too steep for a fork lift, or rollable product, to use. That is, the products or fork lift may be "beached" on the trailer, if the transition between the ramp up and the platform, is too abrupt. The present invention, on the other hand, provides for the platform on the towable trailer to be tiltable, even when the platform is at its lowest position, so that a fork lift truck may be driven onto the platform without difficulty.

Still further, the type of cargo which may be carried on a towable trailer in keeping with the present invention, may be such that its removal from the trailer is best accomplished by dumping the cargo off the rear end of the trailer. For example, a load of crushed stone, sand, or gravel, might fall within this category. Unloading of this type of cargo is also easily accomplished by tilting the platform of the trailer. Indeed, in a combination of effects, it might desirable to unload the cargo onto a raised surface, such as a loading dock. In this situation, the platform of the trailer of the present invention may be raised to the raised surface height, before the platform is tilted to dump the cargo onto the raised surface. As such, raising the platform first, before its cargo can be dumped is easily accomplished using the towable trailer of the present invention.

As a result, contractors and the like may employ the towable trailer of the present invention, to move relatively large or heavy pieces of equipment being installed or removed from a worksite. In many such instances, it is impossible to do so using hauling devices such as vans, pickup trucks or even a flatbed truck. Moreover, the towable trailers of the present invention preclude the need, expense and manoeuvrability, or lack thereof, of larger truck trailers which require fifth wheel tractors to pull them.

In all cases contemplated by the present invention, the requirement for a towed trailer, where the platform of the trailer must be elevated to a required height for removal or loading of its cargo, is met.

In so doing, as will be discussed hereafter, the towable trailer of the present invention employs hydraulic jacks or, in any event, hydraulic cylinders for actuation, or the like, in order to change the elevation and/or tilt of the platform. As is well known to those skilled in the art, the use of hydraulic cylinders provides a very safe environment, especially when the control of the hydraulic cylinders is from a control panel mounted safely on the trailer, or which may even be physically remote from the trailer by perhaps a few meters.

A conventional scissors-style lift assembly is employed in the present invention. However, somewhat unexpectedly, the principal or main hydraulic cylinder which is utilized for elevating and lowering the platform functions by preferably used so as to push its load (the platform, its supporting frame, and a portion of the weight of the scissors-style lift assembly) away from the front end of the towable trailer, rather than pulling it from the back. As a result, the back end of the platform is preferably fixed along a vertical plane.

The present invention is of primary interest in respect of dual axle trailers (or tandem axle trailers), since these trailers typically exhibit adequate stability when standing on their own. However, prior to lifting and/or tilting the platform, the trailer can be stabilized using stabilizing supports, as will be described hereinafter.

Moreover, the trailer itself can be levelled, or set to a desired angle, by the use of these stabilizing supports.

Because of its relatively small size and relative simplicity, a towable trailer in keeping with the present invention may be brought to the market economically, thereby making ownership and usage of the trailer available to small business owners; or even large business owners requiring a considerable number of units of the sort described herein. In any event, especially for a small contractor, the necessity for waiting for pickup and delivery of cargo, and/or the requirement to rent haulage or lifting equipment, may be obviated.

Additionally, the platform can be tilted through use of a second hydraulic cylinder, linked between the scissor jack, and the platform or platform frame, as will be hereinafter described.

DESCRIPTION OF THE PRIOR ART

A number of patents are known which provide various structures for elevating or lowering a payload or other cargo or load.

For example, Wurtz et al, U.S. Pat. No. 5,297,653 issued Mar. 29, 1994, teaches a lift apparatus which is intended to be mounted on a pickup truck. The structure includes a base which is supported on the sidewalls of the cargo compartment of the pickup truck, and two pairs of scissor assemblies. A pair of hydraulic cylinders is attached to a central pivot shaft and they act to move the pivot shaft upward so as to raise the platform. A stabilizer is provided to engage the ground; but because it is longer than the distance to the ground, the truck must be moved a short distance to set the stabilizer in a stabilizing mode.

Hardy et al U.S. Pat. No. 6,460,653 issued Oct. 8, 2002, teaches a combined trailer and hunting stand which may be lifted from its collapsed position to an elevated position whereby a portable and collapsible hunting box may be lifted into a desired elevated position. The structure is carried by a wheeled trailer so that, when the hunting area is arrived at, an ATV may be unloaded from the trailer and the hunting box structure assembled and elevated. A scissor action support structure is employed to change the elevation of the hunting box.

U.S. Pat. No. 7,396,201 issued Jul. 8, 2008 to Pollnow et al. That patent teaches a lift trailer device whose purpose is to load or unload a payload from the ground or loading dock to any height in between. The structure comprises a set of lift pins which are connected to the free ends of respective crank arms. Stub axles carry wheels at each side of the trailer so that the platform may be lowered to ground level between the wheels. The lift trailer device is said to overcome difficulties which are inherent with tiltable trailers, by raising and lowering the platform in a horizontal orientation.

SUMMARY OF THE INVENTION

In accordance with one aspect of the present invention, there is provided a towable trailer, and preferably, a towable tandem axle trailer, having a main towing frame comprising front and rear frame members and side members, at least one axle, and preferably, front and rear axles, a towing tongue at the front end of the trailer, and a platform which is supported on a rectangular inner frame. The inner frame comprises front and rear frame members, and side members. First and second scissors-style lift assemblies, each comprising first and second scissor arms, are hingedly connected one to the other near the scissor arm centres thereof, and are arranged between the main towing frame and the inner frame on each side thereof. Each scissor arm has a lower portion and an upper portion, and generally, the scissor arms are located near the sides of the inner frame.

The bottom end of each first scissor arm is pivotally connected to a respective side member of the main towing frame, preferably near the rear end thereof and preferably on the inner surface thereof. The bottom end of each second scissor arm is slidably connected to a respective side member of the main towing frame, preferably near the front end thereof.

The top end of each second scissor arm is pivotally connected to a respective side member of the inner frame, preferably near the rear end thereof, and the top end of each first scissor arm is slidably connected to a respective side member of the inner frame, preferably near the front end thereof.

A lower cross member and an upper cross member are preferably secured between the two lower portions of the second scissor arms, and the two upper portions of each of the first scissor arms, respectively.

At least one first hydraulic cylinder is connected, preferably extending between the lower and upper cross members, and is hingedly secured to each. When the at least one, hydraulic cylinder is in its rest position, the inner frame lies within or on the main frame, and as such, the inner frame and the main frame are vertically proximate to each other.

Other arrangements are possible, however, including options where the at least one first hydraulic cylinder is attached to cross members which are provided between the two upper portions of the second scissor arms, and the two lower portions of each of the first scissor arm, respectively. The at least one first hydraulic cylinder can also be attached directly to the front or rear frame sections of the main frame, or at other locations. The main function of the hydraulic cylinder is to operate the scissor lift, and while various arrangements can be provided, the above described approach is preferred.

Preferably, only a single first hydraulic cylinder is used, and for brevity, only the use of a single hydraulic cylinder will be hereinafter described.

When the hydraulic cylinder is extended so as to increase its length, the upper and lower portions of the scissor arms are forced apart, and the slidable connections of the bottom ends of each second scissor arm and the top end of each first scissor arm slide rearwardly along the respective side members of the inner frame and the main frame. As a result, by activating the hydraulic cylinder, the inner frame and platform are elevated with respect to the main frame.

In another embodiment of a towable trailer in keeping with the present invention, the top end of each first scissor arm is slidably associated with a respective side member of the inner frame near the front end thereof by way of a coupler which supports the inner frame and platform, but from which the respective side members of the inner frame may be vertically elevated away from its respective coupler.

As before, the first hydraulic cylinder is preferably connected between the lower and upper cross members As before, when the first hydraulic cylinder is in its rest position, the inner frame and the main frame are vertically proximate to each other, and when the first hydraulic cylinder is actuated, movement of the scissor arms causes the inner frame and platform, to rise.

However, in this embodiment, at least one second hydraulic cylinder is provided, which when activated lifts one end, and preferably the front section of the inner frame, and thus, tilts the platform. The second hydraulic cylinder or cylinders, is preferably connected to the upper cross member previously described, and to a front portion of the inner frame. This connection to the front portion of the inner frame is preferably accomplished by adding a further support member to the inner frame which passes from one side member of the inner frame, to the other, at a location preferably near the front section of the inner frame.

When the second hydraulic cylinder or cylinders is or are extended, the front section of the inner frame is thereby lifted from the upper portions of the first scissor arm, and thus, tilt the inner platform, since the upper portions of the second scissor arm, remains pivotably affixed to the inner frame. As a result, the respective side members of the inner frame elevate away from the first scissor arms, whereby, the inner frame and the platform are tilted so that the front end thereof, is at an elevation higher than the rear end thereof.

In this manner, a raisable and tiltable towable trailer has been provided.

The main towing frame typically has a generally rectangular shape, as does the inner frame, particularly when the inner frame is nested within the main towing frame. However, the skilled artisan will be aware that other frame shape are not excluded from the scope of the present invention.

Moreover, in any embodiment of the present invention, the towable trailer will include at least one axle, on which tires can be affixed, in a conventional manner known to the skilled artisan. Preferably, at least two axles, having four tires to provide a tandem axle trailer, is preferred.

Also, the trailer of the present invention also can additionally comprise a rear gate assembly which is hingedly secured to the rear frame member of the inner frame, so that the rear gate may be lowered (typically through more than 90°) so as to form a ramp leading up to the platform.

DETAILED DESCRIPTION OF THE INVENTION

In the present application, the term "towable trailer" refers to any suitable trailer that can be hauled by suitable haulage devices, such as cars, vans, pickup trucks, flatbed truckers, or the like. Preferably, the towable trailers are tandem axle trailers, due to their increased stability for carrying heavier loads.

The towable trailer can be connected to the haulage device using any conventional technology. Most preferably, the towable trailer is connected using a ball and socket, trailer hitch, although other devices such as a fifth wheel arrangement might also be used.

The trailers are typically manufactured using conventional materials for these types of devices. As such, the frames and platforms of the trailers, are commonly made of metals such as iron, steel, aluminum, or the like, although the use of plastics, wood and the like, are not precluded, particularly in respect of the construction of the trailer platform.

The hydraulic devices are conventional, and known to those skilled in the hydraulics art.

Also, the trailer platform is typically, a flat, essentially level surface, although other configurations might be used. Further, the platform might be the lower surface of a container such as a box design or enclosure attached to the inner frame.

It is also noted that the first and second hydraulic cylinders are described as being affixed to particular cross members, or support members. In practise, other arrangements might be used, such as attachment of one or two first hydraulic cylinder to the main towing frame, and to the scissor arms, or to connect the second hydraulic cylinders from the scissor arms, to the inner frame side members. In these cases, the main towing frame, the scissor arms, the inner frame side members, and the like, themselves can also act as cross members and/or support members for attachment of the first and/or second hydraulic cylinders.

As such, in general, the towable trailer of the present invention comprises at least one first hydraulic cylinder for actuating a scissor jack to raise the inner frame (and platform), and in a preferred embodiment, the towable trailer of the present invention further comprises at least one second hydraulic cylinder attached to at least part of the inner frame, so as to raise at least part of the inner frame, and provide a portion of the inner frame (and platform) which is tilted.

Typically, the towable trailer has either a single, preferably central, second hydraulic cylinder, or two second hydraulic cylinders, with at least one second hydraulic cylinder being located near each side of said inner frame.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a first preferred embodiment of the invention will now be illustrated by way of example. It is expressly understood, however, that the drawings are for the purpose of illustration and description only and are not intended as a definition of the limits of the invention.

In particular, embodiments of this invention will therefore now be described, by way of example only, in association with the accompanying drawings in which.

DETAILED DESCRIPTION OF THE PREFERRED EMBODIMENTS

Figure 1:
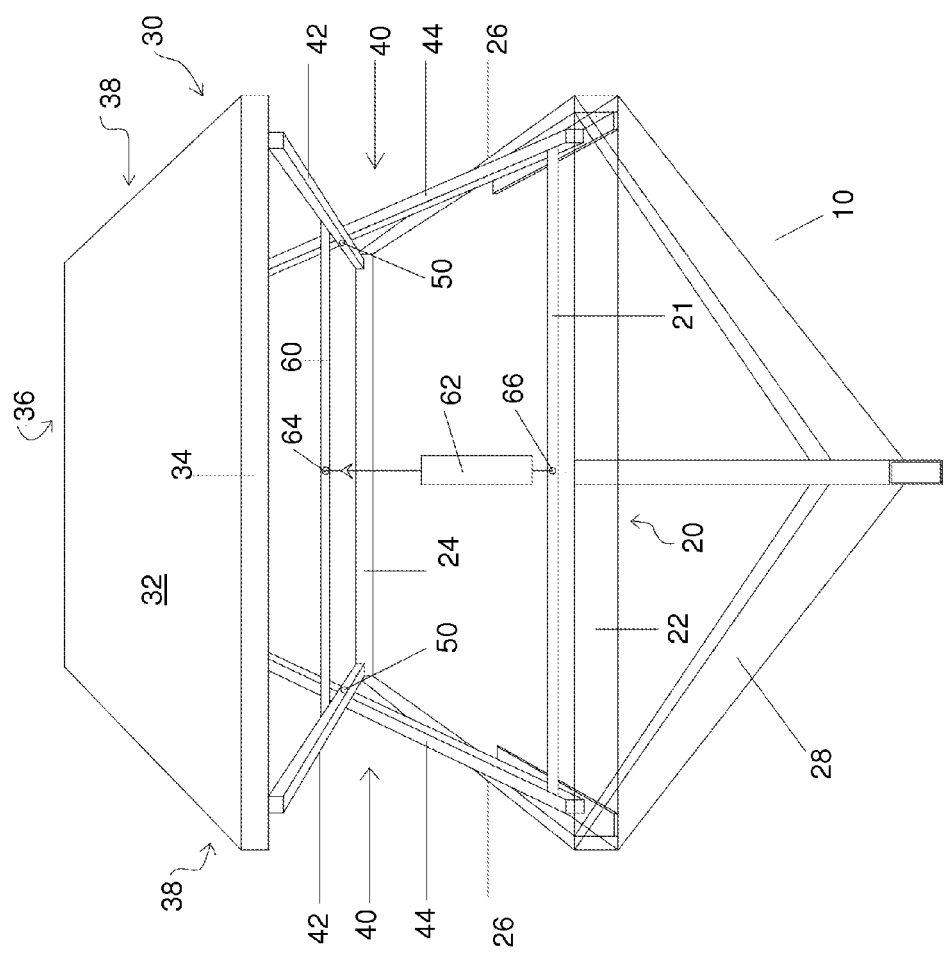
FIG. 1 is a view from the front end of a trailer of the present invention showing the platform in an elevated position.

Referring first to FIGS. 1, 2, 3 and 4, the principal components of a first embodiment of a towable tandem axle trailer 10 in keeping with the present invention, are shown. They include a main towing frame shown generally at 20, and an inner frame shown generally at 30. The main frame 20 comprises front and rear frame members 22 and 24, and side members 26, which rest upon front and rear axles (indicated at 70 and 72 in FIG. 2) with tires, and which has a towing tongue which is at the front end of trailer 10 and is indicated generally at 28.

In general, the inner frame 30 is dimensioned so that it may nest within the inner boundaries of the front, rear, and side members of the main frame 20.

A platform 32 is supported on a rectangular inner frame 30, which inner frame 30 comprises front and rear members 34 and 36, and side members 38.

A pair of first and second scissors-style lift assemblies 40 are arranged so as to be connected between the side members of main frame 20 and the side members of inner frame 30. Each of the scissors-style lift assemblies 40 comprises a first scissor arm 42, which extends from its bottom end near the rear frame member 24 of the main frame 20, to its top end near the front frame member 34 of the inner frame 30; and a second scissor arm 44, which extends from its bottom end near the front frame member 22 of the main frame 20, to its top end near the rear frame member 36 of the inner frame 30.

Attachments or engagements between the scissor arms 42, 44 and the main frames 20 and 30 are, in fact, by way of an attachment or engagement to the respective side frame members 26 and 38.

The first and second scissor arms 42, 44, are hingedly connected one to the other near the centre thereof, as shown at 50. These components and their respective relationships are illustrated schematically, in FIGS. 3 and 4.

Figure 4:
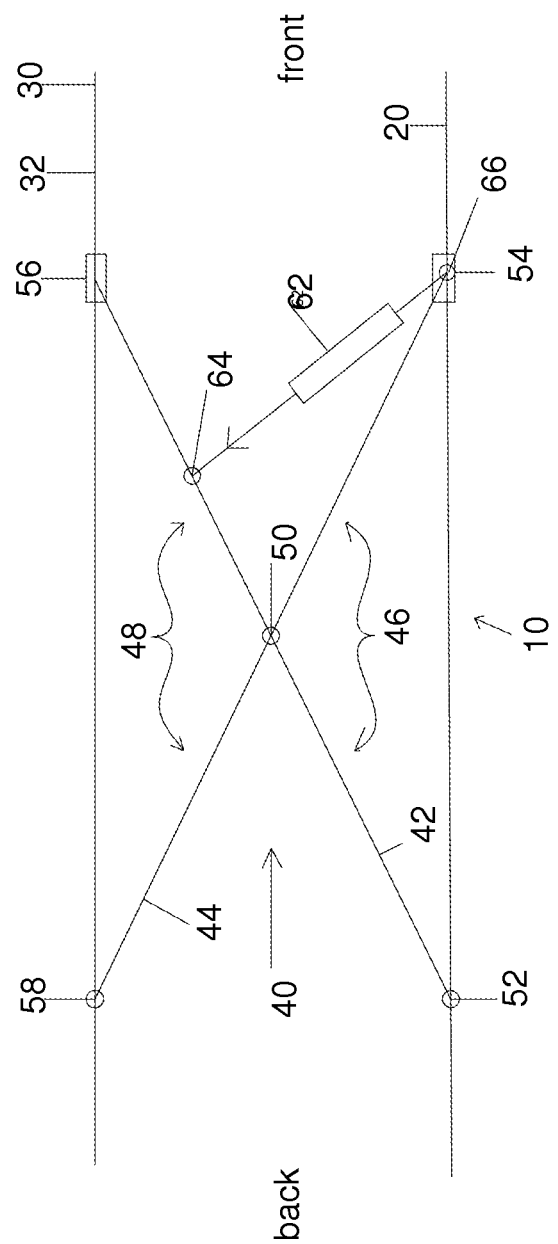
FIG. 4 is a schematic similar to FIG. 3, showing the platform in a more elevated position.

Each of the scissor arms 42 and 44 has a lower portion 46 and an upper portion 48 (see FIG. 4). The bottom end of each first scissor arm 42 is pivotally connected to a respective side member 26 of the main frame 20, at 52. Also, the bottom end of each second scissor arm 44 is slidably connected to a respective side member 26 of the main frame 20, at 54. The nature of that attachment is beyond the scope of the present invention; except it can be noted that the slidable engagement might be rollers or wheels, running, or secured, within a track, or using slidable pads, or other means known to those skilled in the art.

The top end of each first scissor arm 42 is slidably connected to a respective side frame member 38 of the inner frame 30, at 56. The same slidable arrangement as discussed above is suitable. The top end of each second scissor arm 44, in all embodiments of the present invention, is pivotally connected to a respective side frame member 38 of the inner frame 30, at 58.

The lower portions of second scissor arms 44 are connected, one to the other, through lower cross member 21, and the upper portions of first scissor arms 42 are connected, one to the other, through upper cross member 60.

Figure 2:
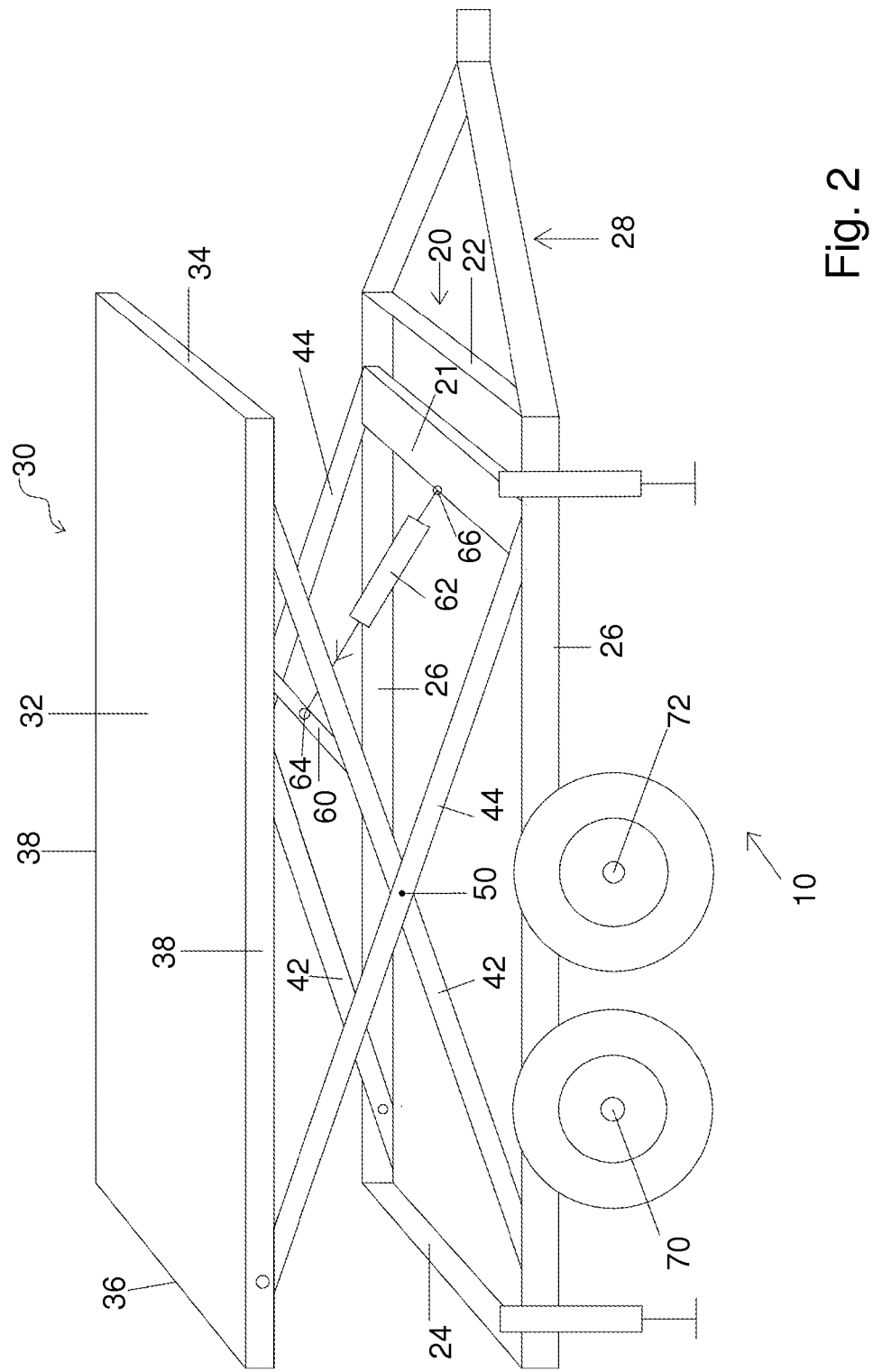
FIG. 2 is a side view from the front left quarter of a trailer, also showing the platform in an elevated position.

A first hydraulic cylinder is pivotably connected between the lower cross member 21 and upper cross member 60 and, as can be seen particularly in FIGS. 1 and 2, at points 66 and 64, respectively. As previously described, the cross members can be located between the lower portions of the first scissor arms, and the upper portions of the second scissor arms, or in a variety of other arrangements. The skilled artisan would be well aware of other configurations.

Figure 3:
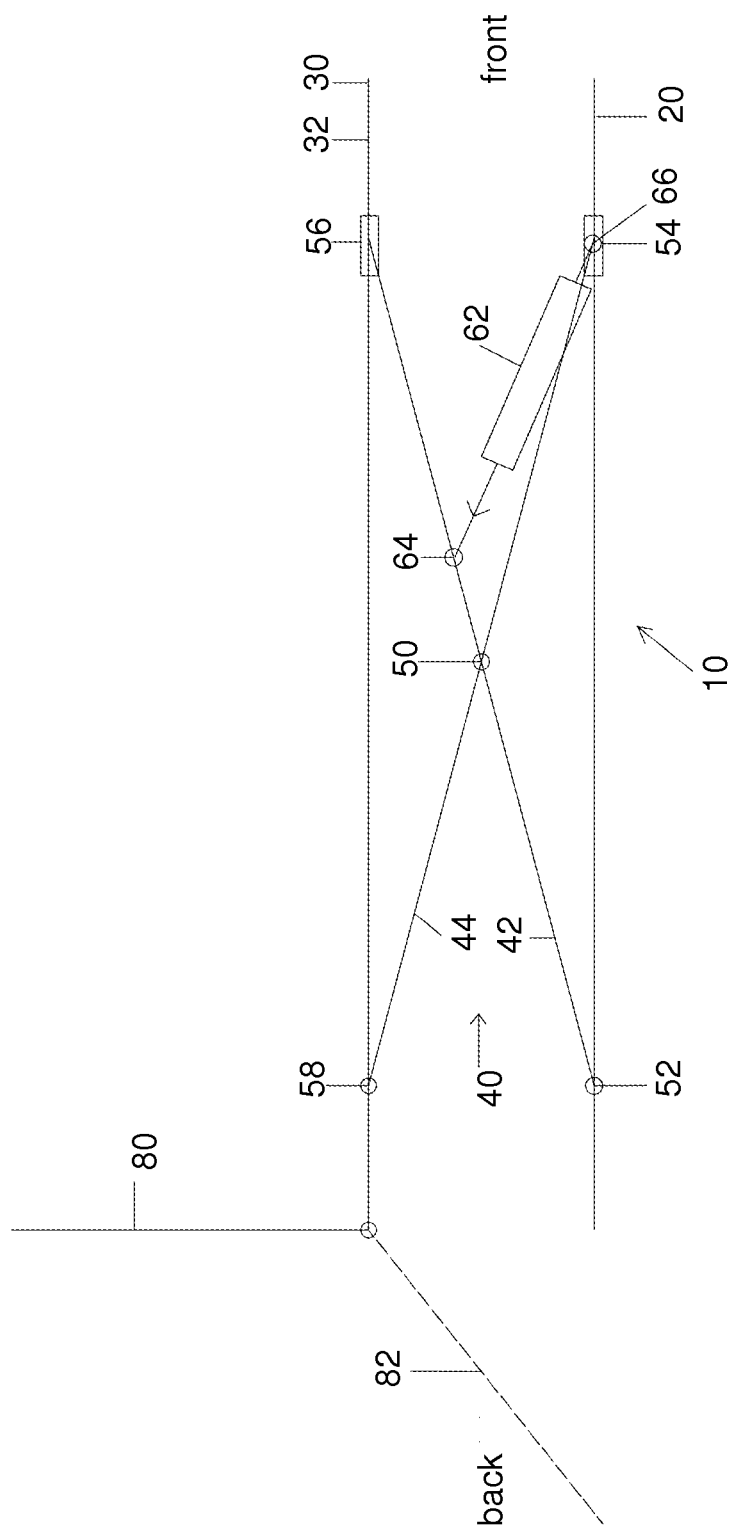
FIG. 3 is a schematic showing the relative positions of the principal components of a first embodiment of a trailer in keeping with this invention, when the platform is in a partially lowered position.

Now, referring particularly to FIGS. 3 and 4, the operation of a first embodiment of the present invention can now be explained. Of course, it will be understood that the towable trailer 10 will have been towed or backed into place so that its cargo can be loaded or unloaded from the specific height requirement which exists at that location and in that situation. Assuming, in the first instance, that the platform 32 has been lowered to its towing position, in general, the inner frame 30 will be nested inside the main frame 20. However, for purposes of clarity, they are shown separated one from another in FIG. 3 (and again in FIG. 5). In any event, the inner frame 30 and the main frame 20 can be understood to be vertically proximate to each other, if not essentially coplanar.

Comparing FIGS. 3 and 4, it will be seen from FIG. 4 that the platform 32 has been elevated. This has been accomplished by extending the operating piston of the first hydraulic cylinder 62 so that the overall length between points 64 and 66, where it is hingedly secured to the upper cross member 60, and the lower cross member 21, is greater than it was before. Obviously, with appropriate control of the first hydraulic cylinder 62, and because of the sliding arrangement of the front ends 54 and 56 of the scissor arms 44 and 42, respectively, the elevation of the inner frame 30, and thus, platform 32 above the main frame 20 can be easily and minutely adjusted. Of course, the first hydraulic cylinder 62 will be operated from a control panel (not shown) which may be mounted in a convenient and safe place on the trailer, or indeed may be detached from the trailer and carried several meters to a safe location.

It should also be apparent from a study of FIGS. 3 and 4, that the relative positions of the inner frame 30 with respect to the main frame 20 are also an artifact of the pivotal connection of the first and second scissor arms 42, 44 at 52 and 58, respectively. In particular, the back end of inner frame 30 is kept essentially in vertical alignment with the back end of main frame 20, as inner frame 30 is raised.

A second major embodiment of the present invention is illustrated more clearly in each of FIGS. 5 to 9, in which a modified towable tandem trailer 10A is shown. In this embodiment, the principal difference with respect to the first embodiment is that inner frame 30, and thus platform 32, may be tilted rearwardly by having its front end being elevated or raised away from the respective scissors-style lift assemblies 40, in a location at or near the front end of the trailer.

In this second embodiment the top end of each first scissor arm 42 is slidably associated with a respective side member 38 of the inner frame 30 by way of a coupler 66A. Characteristics of the coupler 66A are such that it will slidably support the inner frame 30 and platform 32, but the respective side members 38 of the inner frame 30 may be uncoupled from the coupler 66A and raised away from the respective coupler 66A, so as to be free therefrom. This is accomplished by the provision of two second hydraulic cylinders 74. The two second hydraulic cylinders 74 are secured near the outer ends of the upper cross member 60, and are pivotally connected thereto as suggested at attachment point 69. They are also pivotally connected to inner frame 30 through inner frame support member 31 (FIG. 8), as shown at attachment point 67.

The second hydraulic cylinders 74 may, in some circumstances, serve two related purposes. In some circumstances, it may be necessary to level the platform 32 (if trailer 10A is tilted); and in other circumstances as discussed hereafter, it may be necessary or desirable to tilt platform 32. As can be understood from FIGS. 6 and 7, this can be accomplished by adjusting the length of each of the second hydraulic cylinders 74. That adjustment is also suggested by the presence of lines 76 in FIG. 5.

Figure 8:
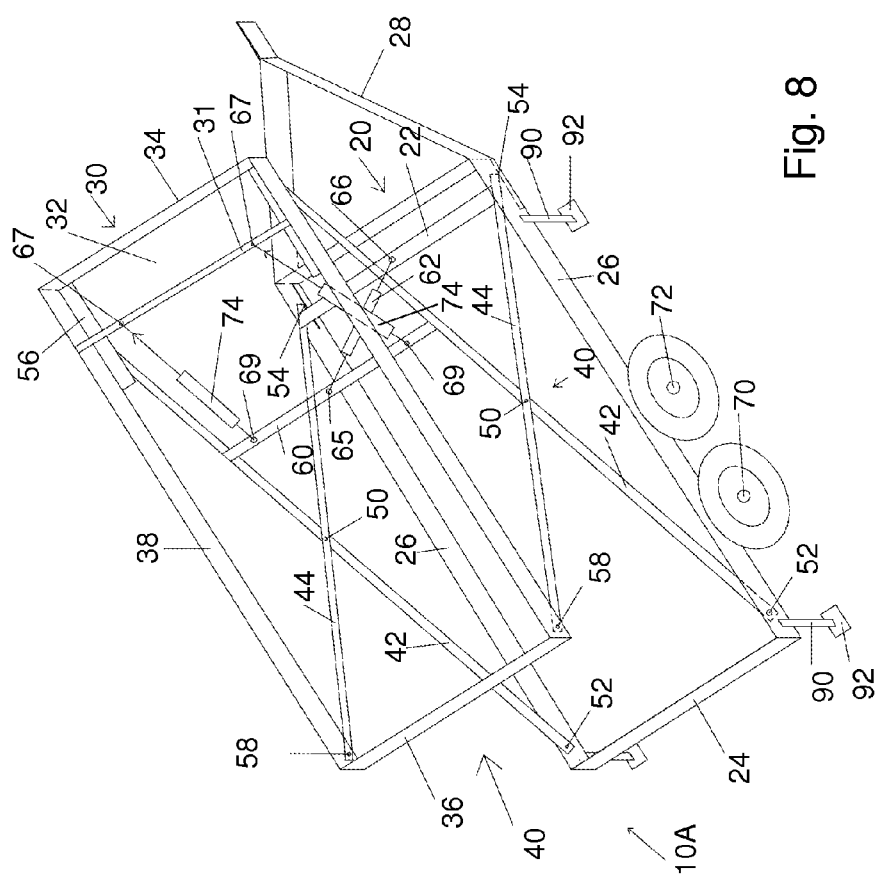
FIG. 8 is an isometric schematic showing further details of the second embodiment in keeping with the present invention, when the platform is in an elevated position.
Figure 9:
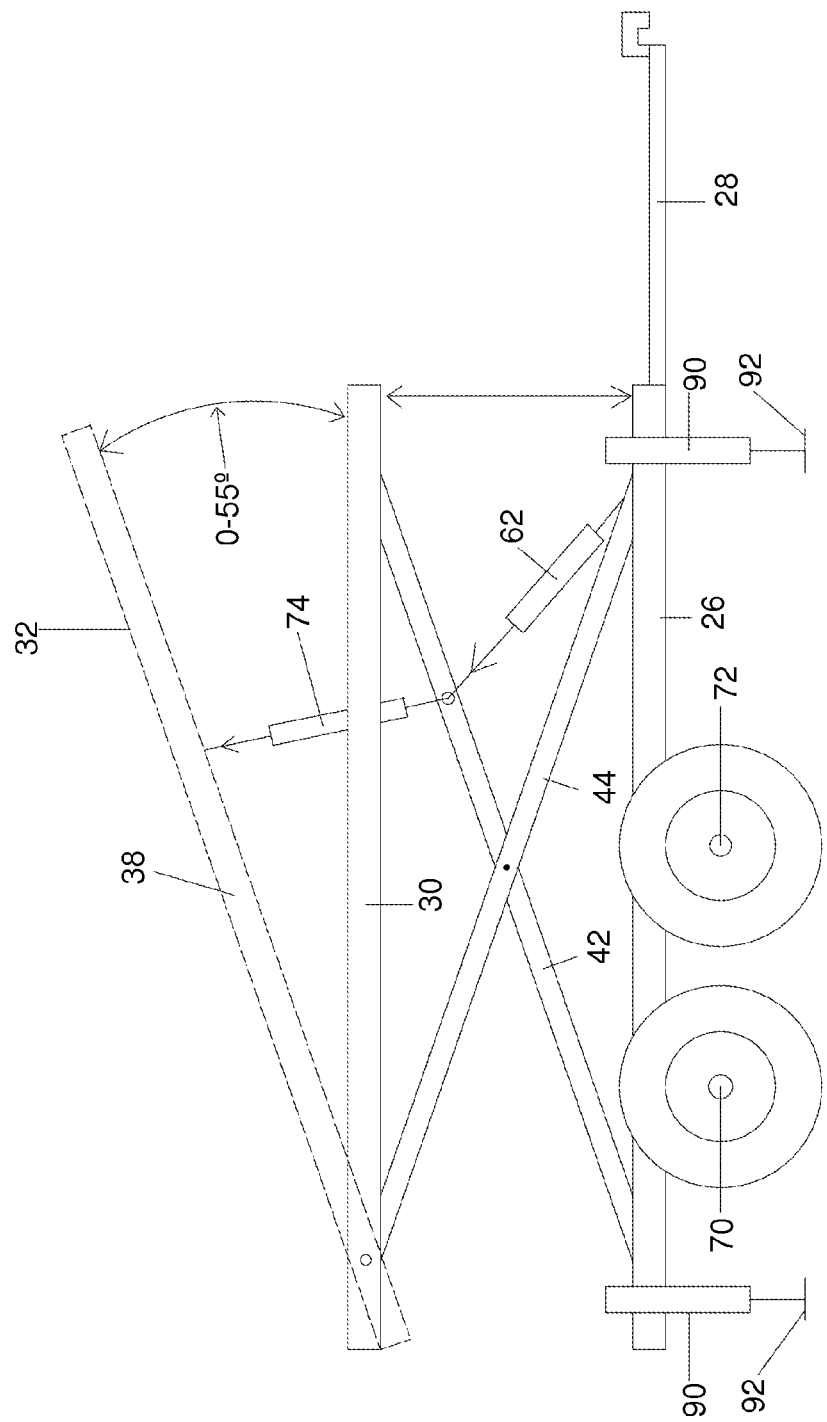
FIG. 9 is a side view of a towable, tandem axle trailer of the second embodiment, wherein the platform is raised and tilted.

Specifically as seen in FIGS. 8 and 9, the end of the platform 32 which is nearer the front end of the trailer can be elevated by a desired amount, such as from 0 to 55°. This may accommodate a situation where it is desired to dump a cargo from the platform 32.

Figure 5:
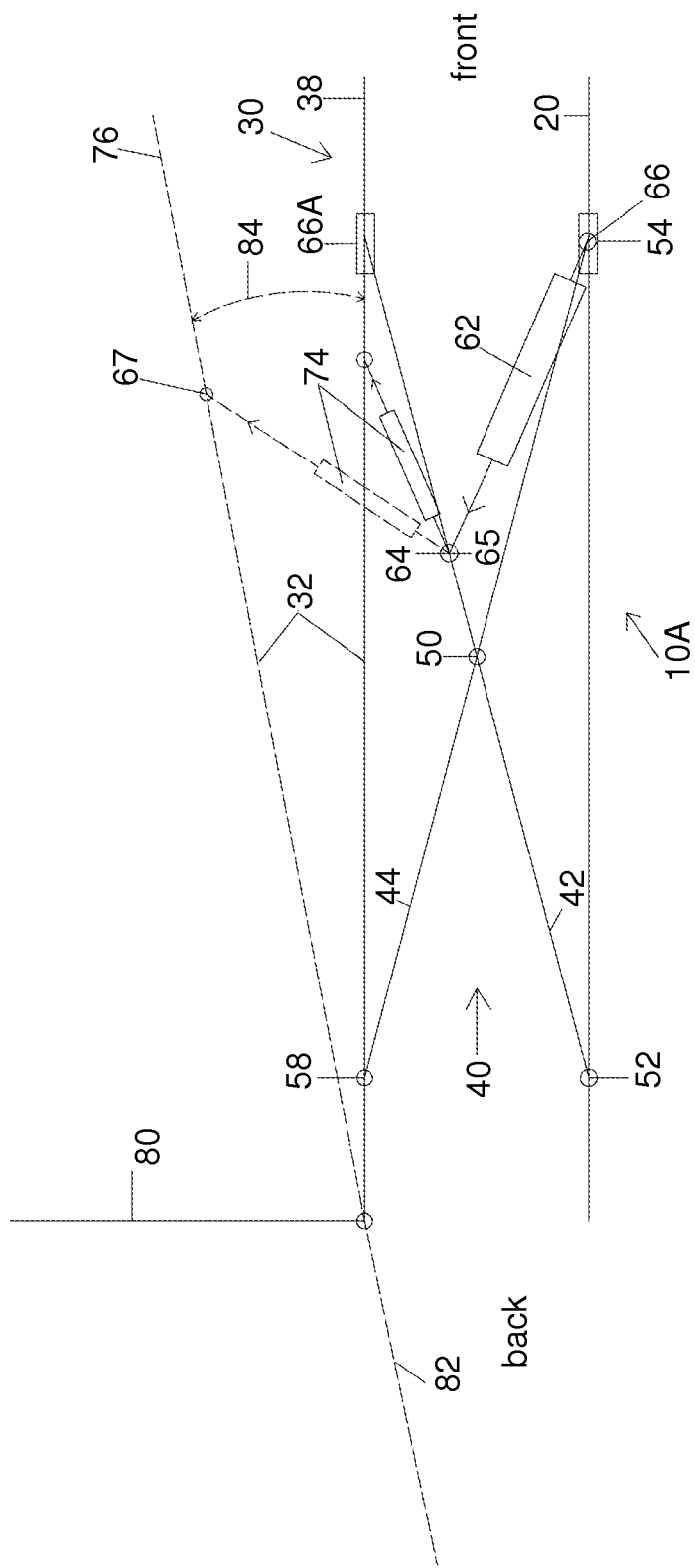
FIG. 5 is a schematic similar to FIG. 3, except showing the relative positions of the principal components of a second embodiment of the present invention.
Figure 6:
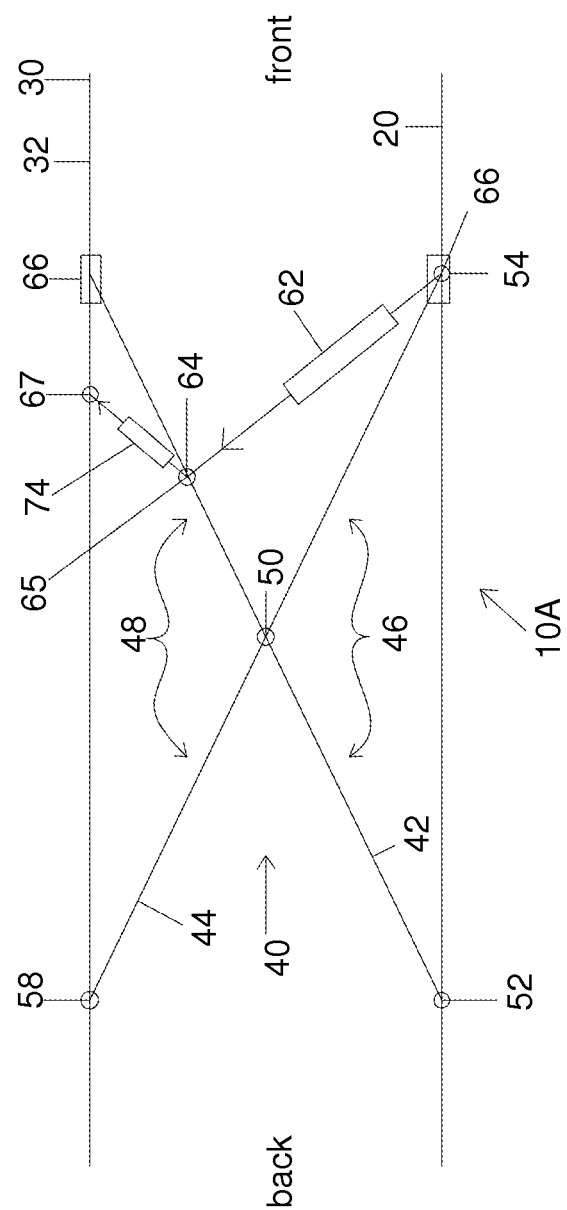
FIG. 6 is a schematic similar to FIG. 4, also showing the relative positions of the principal components of second embodiment.
Figure 7:
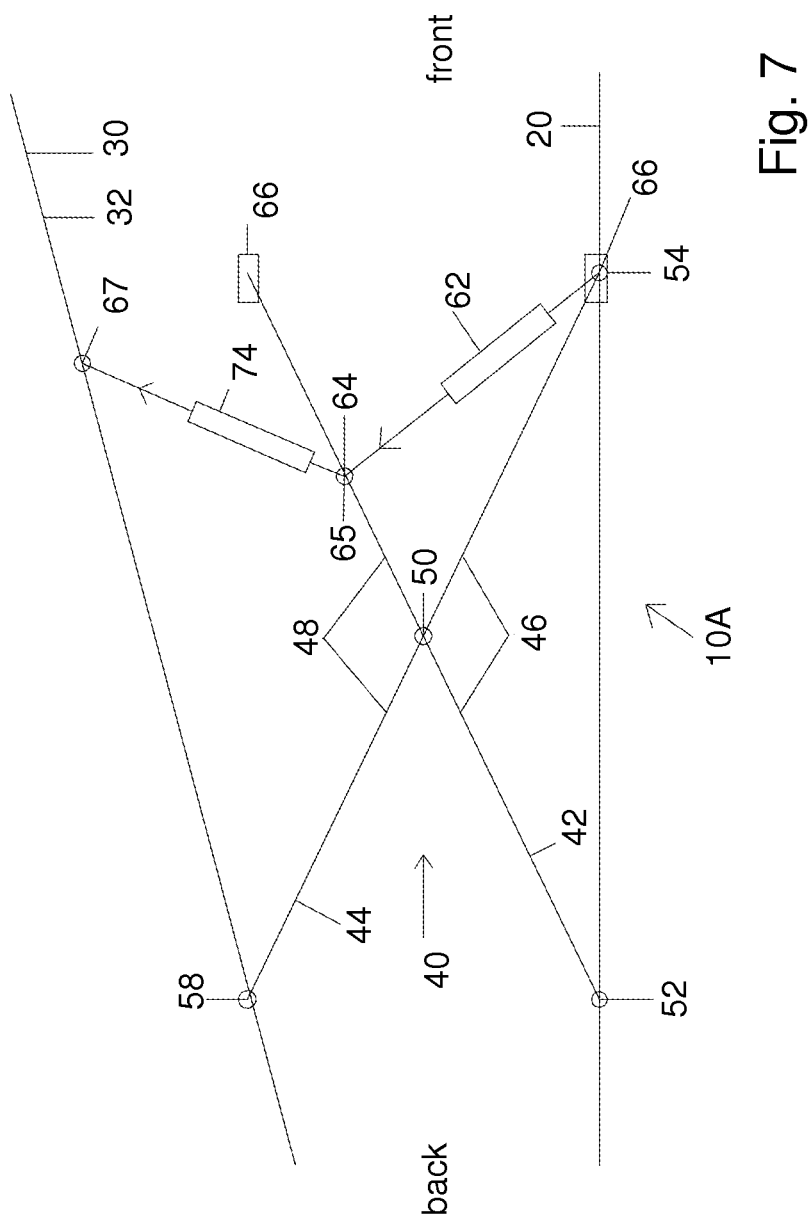
FIG. 7 is a schematic similar to FIG. 6 with the upper frame raised to a tilted position.

Another situation where the tiltable platform 32 is efficiently utilized is shown in FIGS. 3 and 5. In those figures, a trailer in keeping with the present invention is shown being equipped with a rear gate 80. It is very often required to load machinery such as a front end loader or fork lift truck onto the platform 32, and that is accomplished by lowering the rear gate 80 as shown by dashed lines 82. Clearly, as is shown in each of FIGS. 3 and 5, the rear gate 80 may be lowered through more than 90° so as to form a ramp which leads up to the platform 32.

However, sometimes the terrain, and/or the shape and wheelbase of the equipment to be driven on the platform 32, are such that the equipment cannot clear the transition between the rear gate 80 when it is in its down or ramp position, and the platform 32. In that case, the front end of the platform 32 may be easily raised by actuating the second hydraulic cylinders 74, as shown by dashed line 84 in FIG. 5 to any suitable selected angle. The maximum selected angle 84 that platform 32 can be raised is preferably between 1 and 60 degrees, but typically is between 10 and 45 degrees. This arrangement is generally sufficient to overcome the difficulties described immediately above, by more or less aligning the platform 32 together with the ramp when it is in the position 82, as is suggested in FIG. 5.

Additionally, there may be a number of instances where it may be necessary to provide greater lateral stability for the trailer. This can be accomplished by using stabilizers 90 which may have ground pads 92 at their bottom ends. The stabilizers 90 may be crank controlled, but more usually are controlled by further, auxiliary, hydraulic cylinders which are associated with each stabilizer. Stabilizers 90 may also be used to level trailers 10 or 10A, or to provide trailers 10 or 10A with a forward, backward, or side to side tilt, if required.

It will now be clear that the requirement for extensive labor may be reduced because of the ability to raise and lower the platform 32 to a desired elevation, because of the ability to tilt the platform so as to accommodate dumping of cargo from the platform 32, and because of the ability to align the platform 32 with a ramp formed by the rear gate of the trailer so as to more easily drive an industrial vehicle onto the platform 32.

As mentioned above, utilization of towable tandem axle trailers in keeping with the present invention may provide other financial benefits to the owner or user thereof, including the ability for the owner or user to arrange and make their own delivery or pick up supplies and materials; and as well, so as to obviate the necessity for renting haulage equipment and waiting for its arrival to the jobsite.

By using hydraulic cylinders, the structure as described above is essentially failsafe. This will have the benefit of increasing workplace safety, as well as reducing the possibility of employee injuries or equipment or material damage.

It will be understood, though, that the present embodiment has been described with the use of one first hydraulic cylinder, and two second hydraulic cylinders. However, the skilled artisan will be well aware that other combinations of the number and size of hydraulic cylinders can be varied as appropriate.

Moreover, the design designs of the trailer and the inner and main frame can be varied, but are typically selected so as to be consistent with the use of a towable trailer, on public roads and highways. Other possible arrangements for the towable trailer of the present invention are described in FIGS. 10 to 14.

Figure 10:
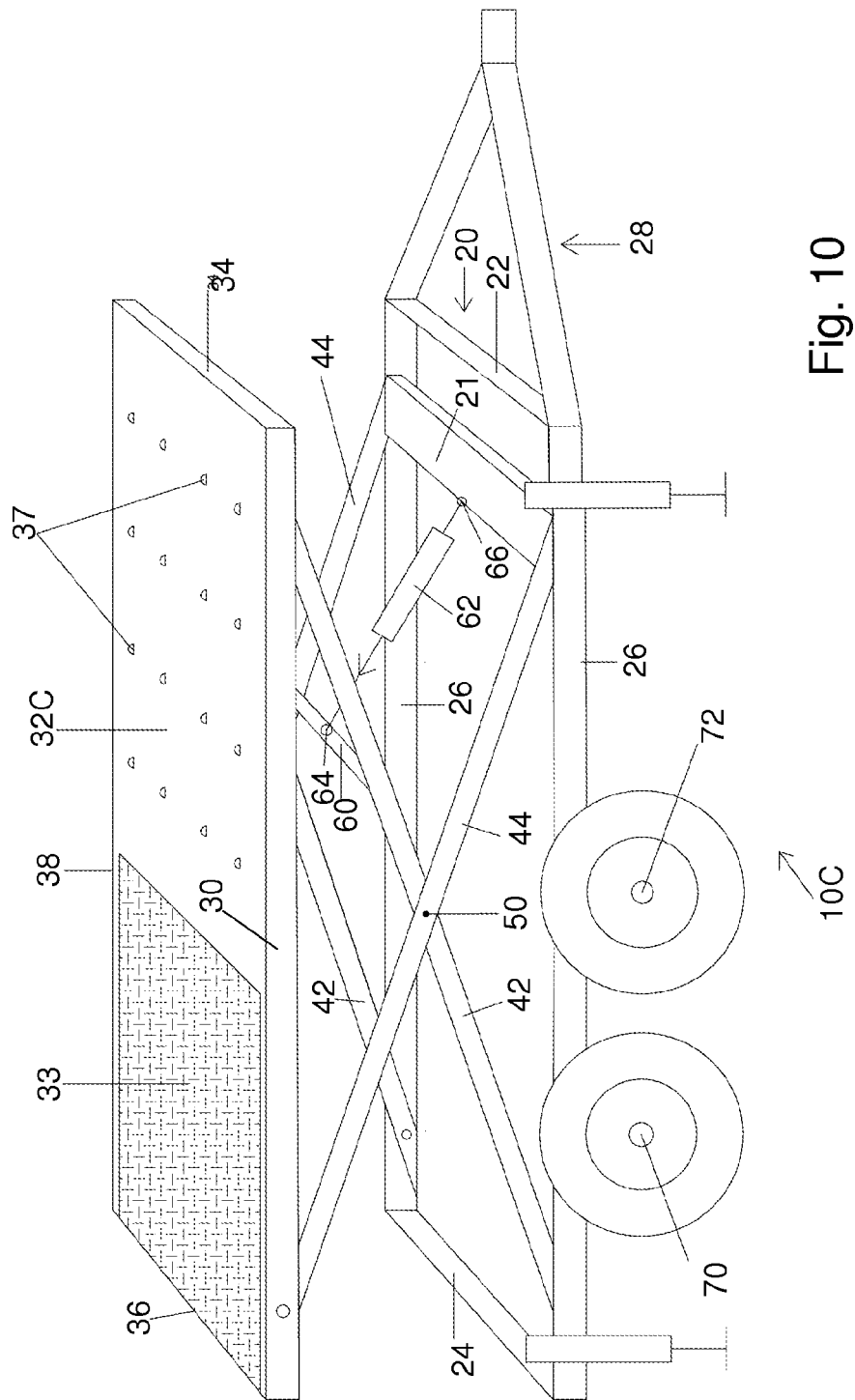
FIG. 10 is a side view of a further embodiment of a towable, tandem axle trailer of the present invention, wherein the platform includes a slideable section.

For example, in FIG. 10, a trailer 10C is shown wherein the front portion of platform 32C is shown with raised projections 37, which are used to prevent sliding of any objects on platform 32C. The rear section 33 of platform 32C is slideable, so that it can be extended directly back from trailer 10C, in a level fashion. As such, section 33 could be extended backwards to provide a level section bridging the distance between the trailer, and a loading dock, for example.

Figure 11:
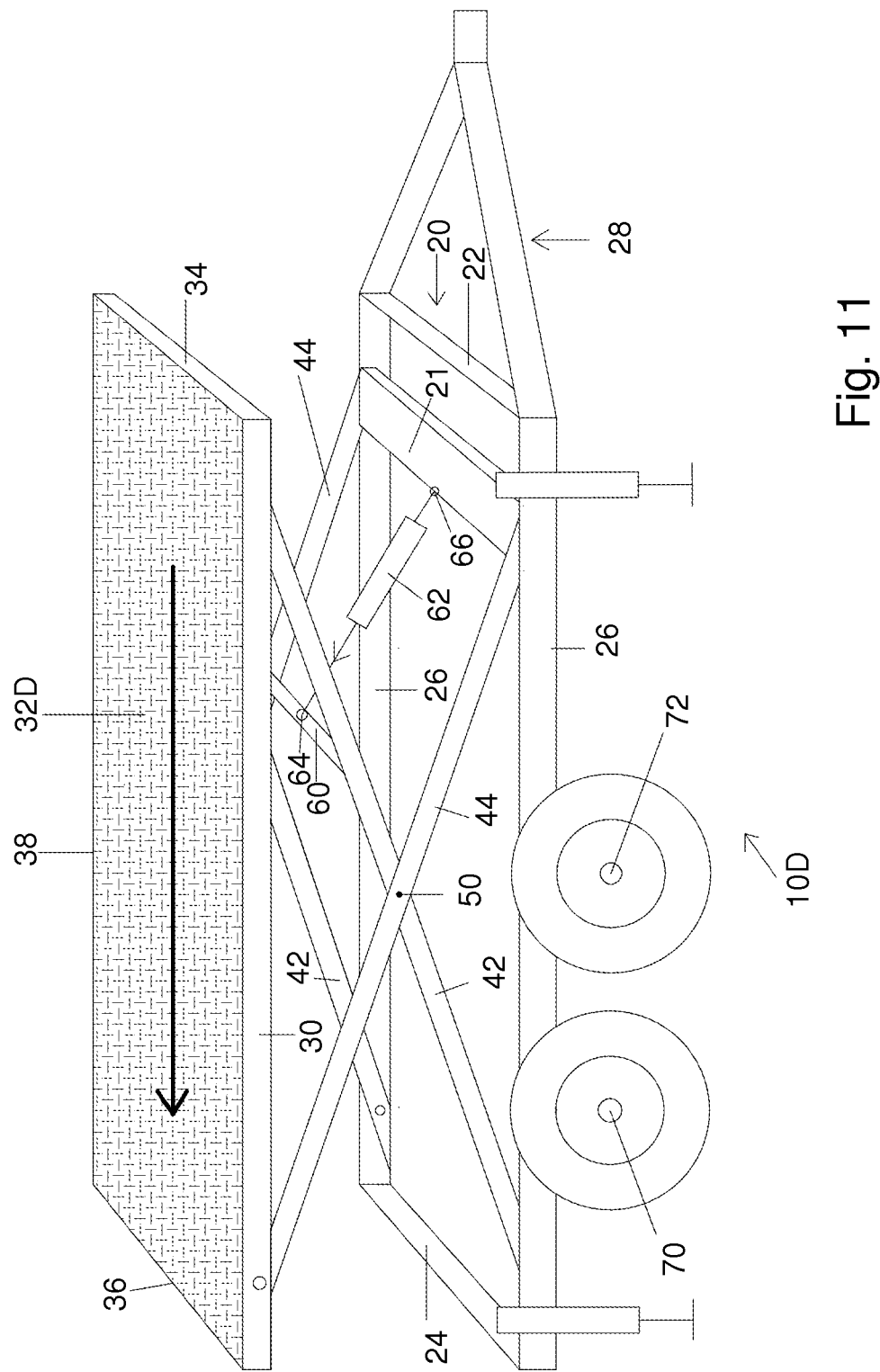
FIG. 11 is a side view of a further embodiment of a towable, tandem axle trailer of the present invention, wherein the entire platform is slideable.

In FIG. 11, a trailer 10D is shown, wherein the entire platform 32D is slidable, as shown by the arrow.

Figure 12:
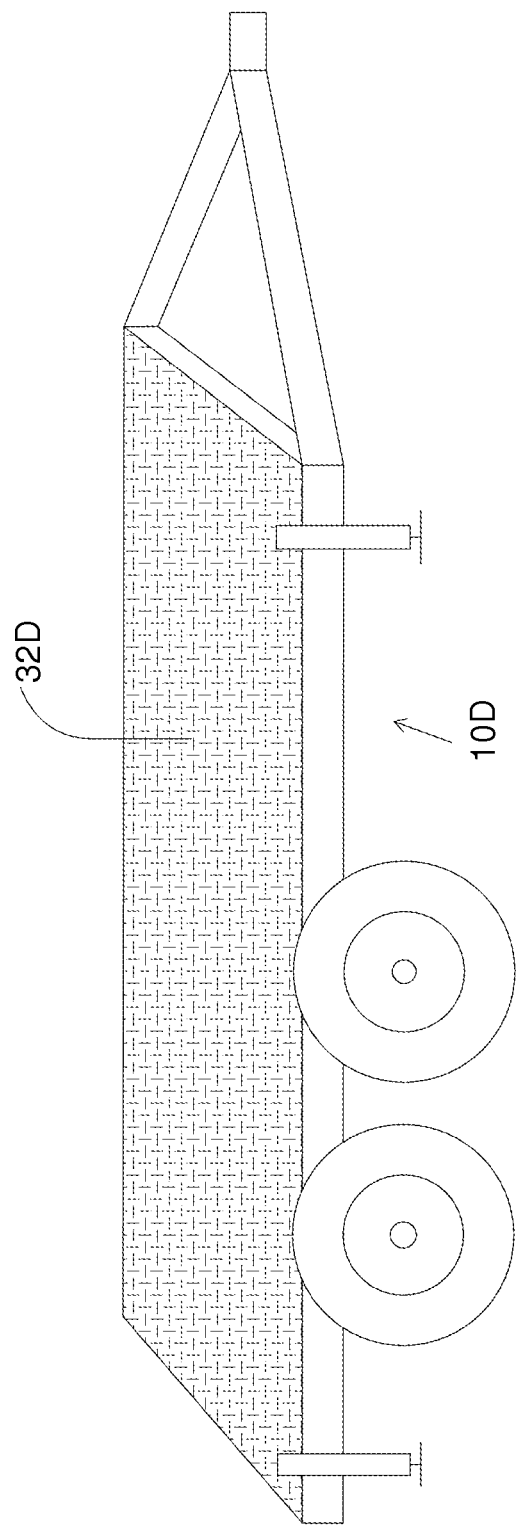
FIG. 12 is a side view of the trailer of FIG. 11, wherein the inner frame is lowered so as to be nested completely within the main frame.

In FIG. 12, trailer 10D is shown, wherein inner frame 30 has been lowered so as to nest within main frame 20. In this configuration, trailer 10D has essentially the same appearance as prior art trailers.

Figure 13:
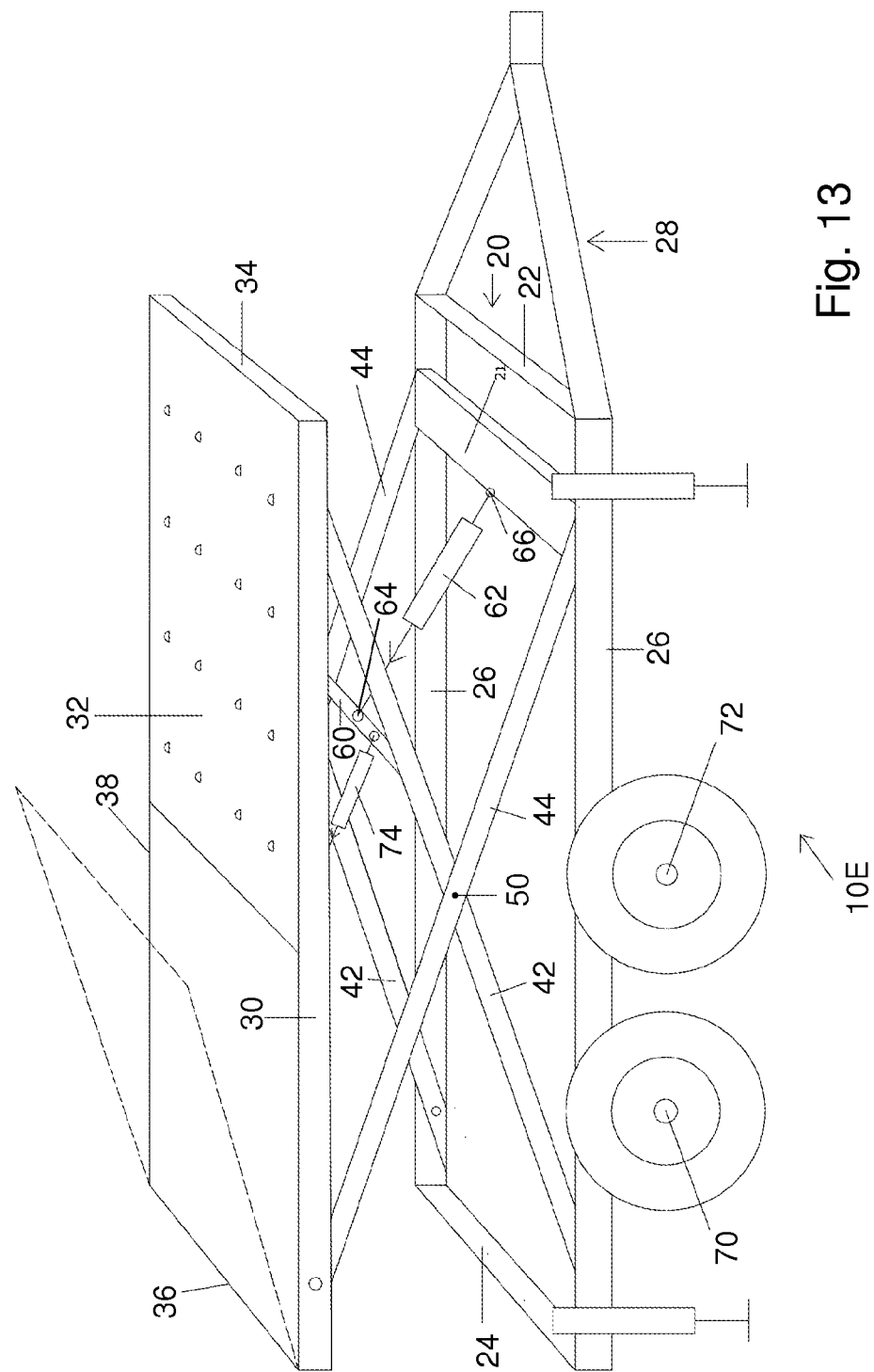
FIG. 13 is a side view of a further embodiment of a towable, tandem axle trailer of the present invention, wherein only a portion of the platform is moveable to a tilted position.

In FIG. 13, trailer 10E is shown, wherein the rear portion 39 of platform 32E is tiltable, in a manner similar to that described in respect of the entire platform 32, in FIG. 9. Again, second hydraulic cylinders 74 can be affixed to only the rear portion 39, to tilt portion 39, as shown in outline.

Figure 14:
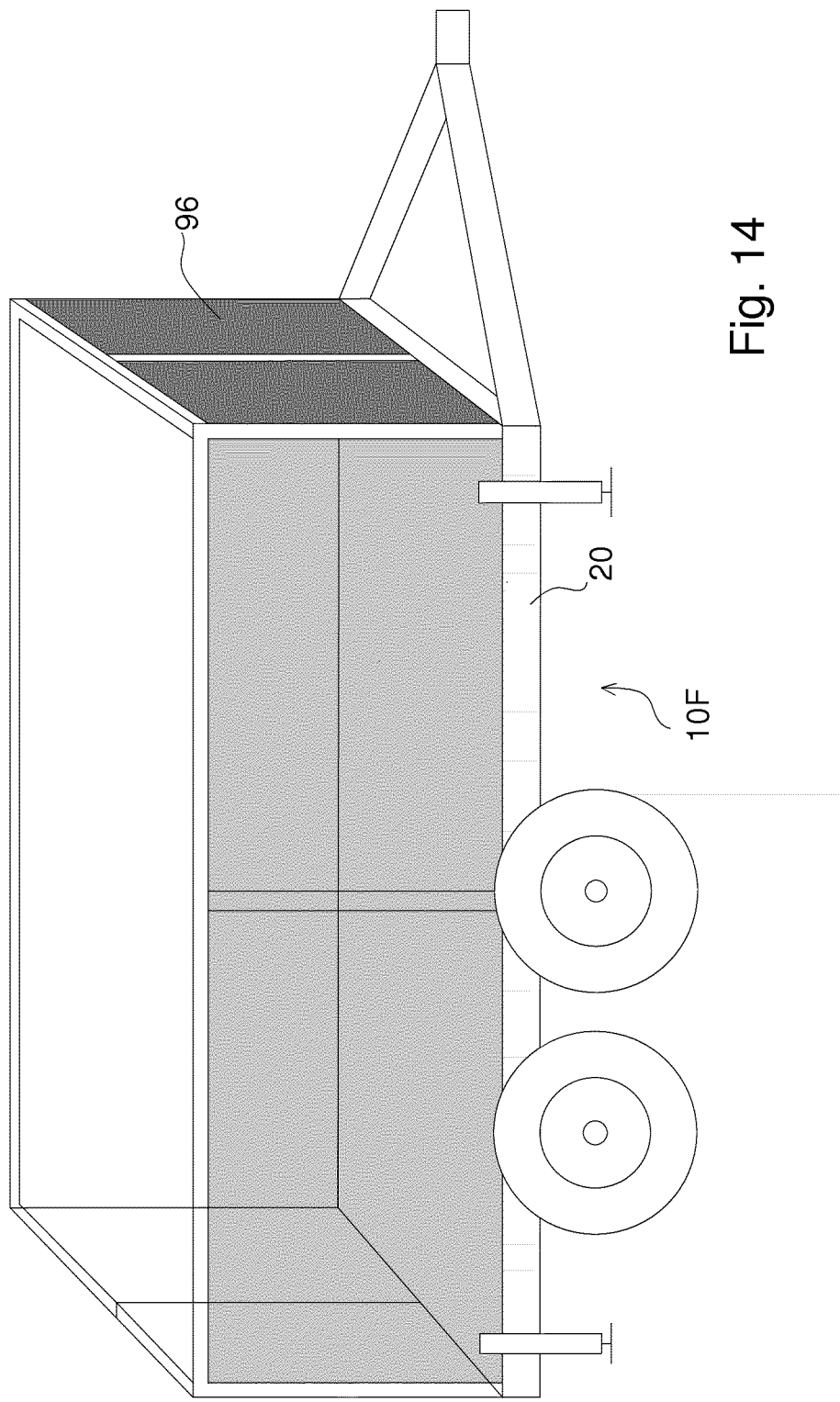
FIG. 14 is a side view of a further embodiment of a towable, tandem axle trailer of the present invention, wherein a wall section has been added to the top of the inner platform.

In FIG. 14, trailer 1 OF is shown having walls 96 which have been added to outer frame 20, so as to contain any loose articles within the confines of the trailer. Walls 96 might also be affixed to inner frame 30, if desired, so that walls 96 would be raised and lowered with the inner frame 30, and platform 32. Walls 96 might also be removable, when not needed.

Figure 15:
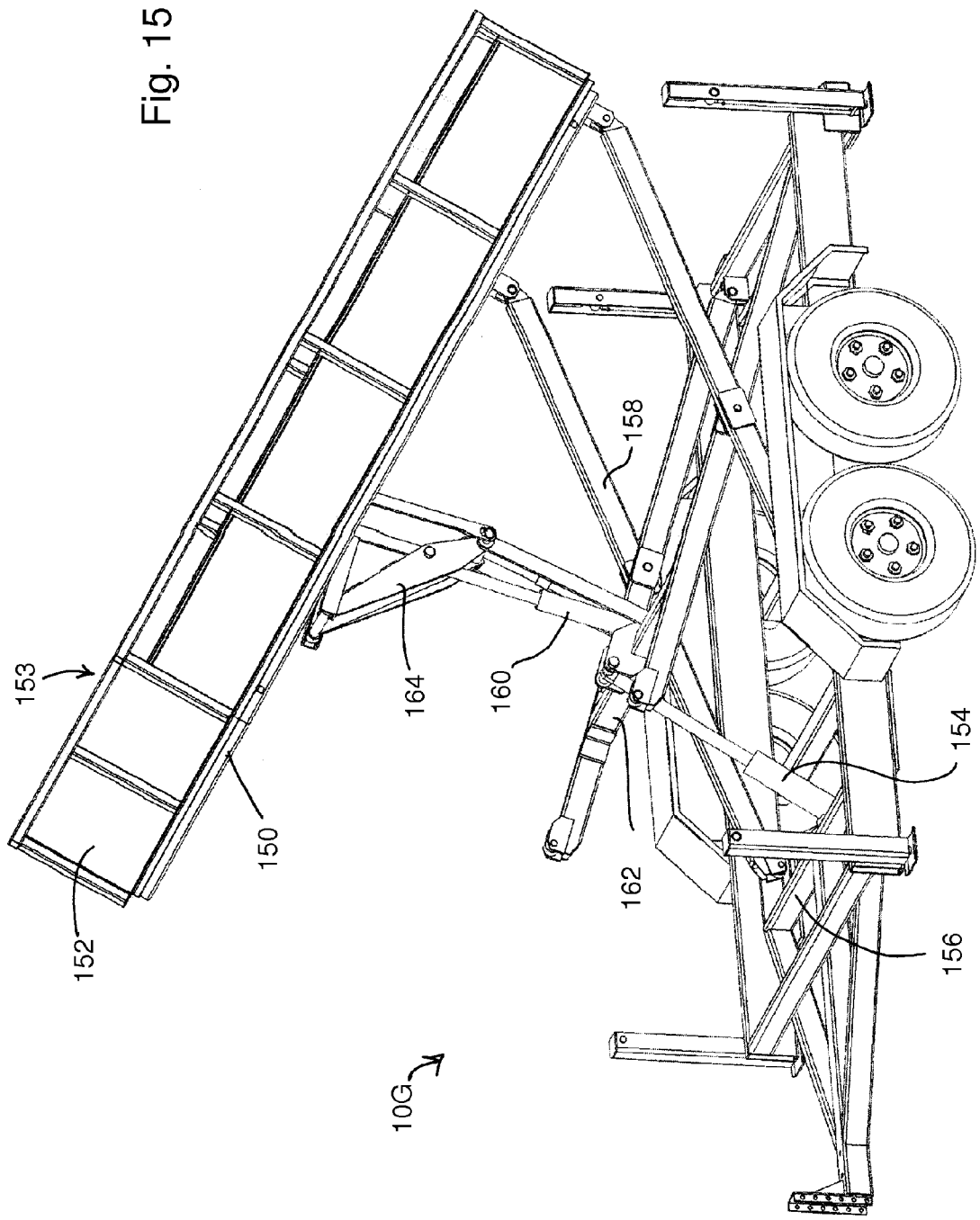
FIG. 15 is a perspective side view of a further embodiment of a towable, tandem axle trailer of the present invention.

Finally, in FIG. 15, a trailer 10G is shown having a bed 150 enclosed by four sides 152 to form box 153, and which has a first single hydraulic cylinder 154 which is attached to fixed cross member 156, and to scissor assembly 158. A single second hydraulic cylinder 160 is fixed to an upper cross member 162 and to a support structure 164. Second hydraulic cylinder 160 is used to replace the double cylinders 62 in previous embodiments, and in the embodiment shown in FIG. 15, the single, second hydraulic cylinder 160 is used to raise or lower one end of bed 150.

Thus, it is apparent that there has been provided, in accordance with the present invention, a towable trailer which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively. Also, the use of the terms such as "front", "back", "side", "up" and "down", and the like, are used in a general sense in respect of the normal orientation and operation of the towable trailer of the present invention.

Also, while this discussion has addressed prior art known to the inventor, it is not an admission that all art discussed is citable against the present application.

What is claimed is:

1. A towable trailer having a towing frame comprising:
a main towing frame having front and rear frame members and side members, at least one axle, and a towing tongue at the front end of said trailer;
a platform supported on a rectangular inner frame, wherein said inner frame comprises front and rear frame members, and side members;
wherein first and second scissors-style lift assemblies, each comprising first and second scissor arms are hingedly connected one to the other near the center thereof, and are arranged between said main towing frame and said inner frame on each side thereof; and wherein each scissor arm has a lower portion and an upper portion;
wherein the bottom end of each first scissor arm is pivotally connected to a respective side member of said main towing frame near the rear end thereof and on the inner surface thereof, and wherein the bottom end of each second scissor arm is slidably connected to a respective side member of the main towing frame near the front end thereof;

wherein the top end of each second scissor arm is pivotally connected to a respective side member of said inner frame near the rear end thereof, and the top end of each first scissor arm is slidably connected to a respective side member of said inner frame near the front end thereof;

wherein at least one first hydraulic cylinder is provided for actuating said scissor-style lift assemblies whereby, when said hydraulic cylinder is in its rest position, said inner frame and said main frame are vertically proximate to each other;

wherein, when said hydraulic cylinder is extended so as to increase its length, said slidable connections of the bottom ends of each second scissor arm and the top end of each first scissor arm slide rearwardly along the respective side members of said inner frame and said main frame, so that said platform is elevated with respect to said main frame;

wherein said top end of each first scissor arm is slidably associated with said side members by use of a coupler; and wherein said towable trailer additionally comprises at least one second hydraulic cylinder, which when activated, elevates the respective side members of said inner frame whereby the to ends of said first scissor arms are uncoupled from their respective couplers, while the top ends of said second scissor arms remain pivotally attached to said inner frame, in order that said inner frame and said platform are tilted so that said front end of said inner frame of said platform is at an elevation higher than said rear end thereof.

2. A towable trailer as claimed in claim 1 additionally comprising an upper cross member secured between the upper portions of each of said first scissor arms, and a lower cross member secured between the lower portions of each of said second scissor arms, and wherein said at least one first hydraulic cylinder is hingedly connected between said upper cross member and said lower cross member.

3. The towable trailer of claim 1, further comprising a rear gate assembly hingedly secured to the rear frame member of said inner frame, so that it may be lowered so as to form a ramp leading up to said platform.

4. The towable trailer of claim 1, wherein said towable trailer is a tandem axle trailer.

5. The towable trailer of claim 1, wherein said inner frame is nested within said main frame, when said first hydraulic cylinder is in its rest position.

6. The towable trailer of claim 1 wherein said at least one second hydraulic cylinder is connected to said upper cross member, and to a front portion of the inner frame.

7. The towable trailer of claim 1 wherein said at least one second hydraulic cylinder is connected to said upper cross member, and to a support member which passes from one side member of the inner frame, to the other, at a location near the front frame member of said inner frame.

8. The towable trailer of claim 1, wherein only a single, second hydraulic cylinder is provided.

9. The towable trailer of claim 8, wherein said single, second hydraulic cylinder is centrally located.

10. The towable trailer of claim 1 wherein at least two second hydraulic cylinders are provided, with at least one second hydraulic cylinder being located near each side of said inner frame.

11. The towable trailer of claim 3, wherein said rear gate assembly may be lowered through more than 90° so as to form a ramp leading up to said platform.

* * * * *